(12) United States Patent
Son

(10) Patent No.: US 9,183,409 B2
(45) Date of Patent: Nov. 10, 2015

(54) USER DEVICE AND OPERATING METHOD THEREOF

(71) Applicant: Samsung Electronics Co., Ltd., Suwon-si, Gyeonggi-do (KR)

(72) Inventor: Dong-Il Son, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/230,712

(22) Filed: Mar. 31, 2014

(65) Prior Publication Data
US 2014/0359751 A1   Dec. 4, 2014

(30) Foreign Application Priority Data

Jun. 4, 2013   (KR) .................. 10-2013-0063946

(51) Int. Cl.
| | | |
|---|---|---|
| G06F 21/00 | (2013.01) | |
| G06F 21/62 | (2013.01) | |
| H04L 29/08 | (2006.01) | |
| H04W 12/08 | (2009.01) | |
| H04W 48/16 | (2009.01) | |
| H04W 84/12 | (2009.01) | |

(52) U.S. Cl.
CPC .............. *G06F 21/629* (2013.01); *H04L 67/34* (2013.01); *H04W 12/08* (2013.01); *H04W 48/16* (2013.01); *G06F 2221/2111* (2013.01); *G06F 2221/2115* (2013.01); *H04W 84/12* (2013.01)

(58) Field of Classification Search
USPC ...................................... 726/16–20
See application file for complete search history.

(56) References Cited

U.S. PATENT DOCUMENTS

| | | | |
|---|---|---|---|
| 2009/0154701 A1* | 6/2009 | Kosaraju et al. ............... | 380/270 |
| 2010/0235621 A1* | 9/2010 | Winkler et al. ............... | 713/153 |
| 2011/0141276 A1 | 6/2011 | Borghei | |
| 2012/0174237 A1 | 7/2012 | Krzyzanowski | |

FOREIGN PATENT DOCUMENTS

| | | |
|---|---|---|
| EP | 1542400 A2 | 6/2005 |
| KR | 10-2006-0057467 A | 5/2006 |
| KR | 10-2010-0113385 A | 10/2010 |

OTHER PUBLICATIONS

Anonymous, Pairing (computing), Wikipedia—the free encyclopedia, Oct. 19, 2012.

* cited by examiner

*Primary Examiner* — Ghazal Shehni
(74) *Attorney, Agent, or Firm* — Jefferson IP Law, LLP

(57) ABSTRACT

A security method in an electronic device is provided. The method includes pairing the electronic device with an Access Point (AP), obtaining at least one item of information about the AP, and setting a security level of the electronic device according to the at least one item of information.

16 Claims, 25 Drawing Sheets

USER DEVICE AND OPERATING METHOD THEREOF

CROSS-REFERENCE TO RELATED APPLICATION(S)

This application claims the benefit under 35 U.S.C. §119(a) of a Korean patent application filed on Jun. 4, 2013, in the Korean Intellectual Property Office and assigned Serial number 10-2013-0063946, the entire disclosure of which is hereby incorporated by reference.

TECHNICAL FIELD

The present disclosure relates to a user device having a security function and an operating method thereof.

BACKGROUND

At present, owing to the growth of electronic communication industries, user devices such as cellular phones, electronic schedulers, personal terminals, laptop computers, and the like are becoming necessities to modern society while being significant means for delivery of fast changing information. The user devices make users' works convenient through a Graphical User Interface (GUI) environment using a touch screen and have come to provide various multimedia based on a web environment. Generally, the user devices provide personalized services, and are configured to operate with security. However, users are not currently provided with a method or apparatus for setting a security level corresponding to a surrounding environment.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for setting a security level of a user device according to a surrounding environment.

Another aspect of the present disclosure is to provide a method for setting a lock of a user device suitable to a security level.

Another aspect of the present disclosure is to provide a method for setting a security level of a user device according to at least one item of information about an Access Point (AP).

The above aspects are achieved by providing an electronic device and an operating method thereof.

In accordance with an aspect of the present disclosure, a security method in an electronic device is provided. The method includes pairing the electronic device with an AP, obtaining at least one item of information about the AP, and setting a security level of the electronic device according to the at least one item of information.

In accordance with another aspect of the present disclosure, an electronic device is provided. The electronic device includes a pairing module, an acquisition module, and a security setting module. The pairing module is configured to pair with an AP. The acquisition module is configured to obtain at least one item of information about the AP. The security setting module is configured to set a security level of the electronic device according to the at least one item of information.

In accordance with another aspect of the present disclosure, an electronic device is provided. The electronic device includes one or more processors configured to execute computer programs, a memory configured to store data and instructions, and at least one program stored in the memory and configured to be executable by the one or more processors. The program pairs the electronic device with an AP, and adjusts a lock level of the electronic device according to use restriction information set to the AP.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
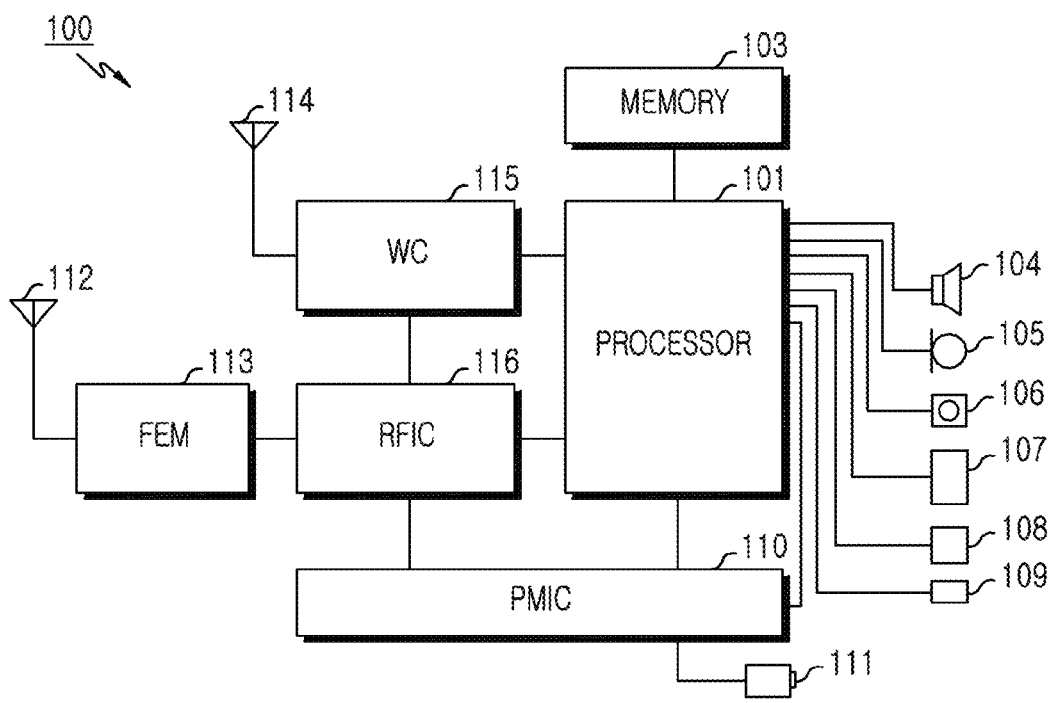
FIG. 1 is a block diagram illustrating a construction of a user device according to an embodiment of the present disclosure.

FIG. 1 is a block diagram illustrating a construction of a user device according to an embodiment of the present disclosure.

The user device 100 may be one of an electronic device such as a mobile phone, a mobile pad, a media player, a tablet computer, a handheld computer, a Personal Digital Assistant (PDA), and a digital camera. Also, the user device 100 may be any user device including a device combining two or more functions among these devices.

Referring to FIG. 1, the user device 100 can include a processor 101, a memory 103, a speaker 104, a microphone 105, a camera 106, a display 107, a touch panel 108, a sensor 109, a Power Manager Integrated Circuit (PMIC) 110, a battery 111, a cellular antenna 112, a Front End Module (FEM) 113, a Wireless Connectivity (WC) antenna 114, WC 115, and a Radio Frequency Integrated Circuit (RFIC) 116.

The processor 101 controls the general operation of the user device 100. The processor 101 performs a function of executing an Operating System (OS) and an application program of the user device 100 and controlling other parts and devices. The processor 101 can include an Application Processor (AP) for performing a key function of the entire system, a Communication Processor (CP) for performing communication, a Graphic Processing Unit (GPU) for processing 2-Dimensional (2D) and 3-Dimensional (3D) graphics, an Image Signal Processor (ISP) for taking charge of image signal processing, an Audio Signal Processor (ASP) for taking charge of voice signal processing, a memory semiconductor, a system interface, and the like. The processor 101 can be a System On Chip (SOC) in which various parts are integrated as one.

The AP plays a brain role of the user device 100, and can support a function of computation processing, a function of playing contents of various formats such as an audio, an image, a video, and the like, a graphic engine, and the like. The AP can drive an operating system applied to the user device 100, various functions, and the like. The AP can perform a great number of functions of a core, a memory, a display system/controller, a multimedia encoding/decoding (CODEC), a 2D/3D accelerator engine, an Image Signal Processor (ISP), a camera, an audio, a modem, various high and low speed serial/parallel connectivity interfaces, and the like. The AP can execute various software programs (i.e., instruction sets) stored in the memory 103 to perform various functions of the user device 100, and perform processing and control for voice communication, image communication, and data communication. The AP can execute software programs (i.e., instruction sets) stored in the memory 103 to perform various functions corresponding to the programs. The AP can be an SOC integrating all of a GPU, an ISP, an ASP, a memory semiconductor, and a system interface.

The CP can perform voice communication and/or data communication, and can compress voice data and image data or decompress the compression thereof. The CP can be a baseband modem, a Baseband Processor (BP), or the like. The CP can be designed to operate through one of a Global System for Mobile Communication (GSM) network, an Enhanced Data GSM Environment (EDGE) network, a Code Division Multiple Access (CDMA) network, a Wireless-Code Division Multiple Access (W-CDMA) network, a Long Term Evolution (LTE) network, an Orthogonal Frequency Division Multiple Access (OFDMA) network, a WiFi network, a Wireless interoperability for Microwave Access (WiMAX) network, and a BLUETOOTH network.

The GPU can process computation related to graphics, and take charge of image information processing, acceleration, signal conversion, picture output, and the like. The GPU can solve a bottleneck phenomenon caused by a graphic work of the AP, and can process 2D or 3D graphics faster than the AP.

The ISP can convert electrical signals (i.e., image data) from the camera 106, into image signals. The ISP can change a color sense of the image data from the camera 106 into a format such as a real image, and can adjust brightness. The ISP can perform Automatic Exposure (AE), Automatic White-Balance (AWB) automatically adjusting a white balance according to a change of a color temperature of an incident light source, Automatic Focus (AF) automatically focusing a subject, and the like. The ISP can analyze a frequency component of the image data obtained from the camera 106, and recognize a definition of an image to adjust an F-number of the iris of the camera 106 and a shutter speed. The ISP can temporarily store the image data from the camera 106 in the memory 103 (e.g., buffer memory).

The ASP can process computation related to an audio, and can change an audio signal of a digital or analog form through an audio effect or effect unit.

The memory 103 can store software related programs (i.e., instruction sets) executable by the aforementioned processors. The memory 103 can include high-speed random access memories and/or non-volatile memories such as one or more magnetic disk storage devices, one or more optical storage devices and/or flash memories (for example, Not AND (NAND) memories, Not OR (NOR) memories). A total of storage time of video data obtained from an image sensor can be proportional to an available capacity of the memory 103.

Software can include an OS program, a communication program, a camera program, a graphical program, one or more application programs, a user interface program, a CODEC program, a security program, and the like. The term of program may be expressed as a set of instructions or an instruction set. The OS program can use various functions of the communication program, the camera program, the graphical program, the one or more application programs, the user interface program, and the CODEC program through various Application Programming Interfaces (APIs).

The OS program indicates an embedded operating system such as WINDOWS, LINUX, Darwin, RTXC, UNIX, OS X, or VxWorks, and can include various software constituent elements controlling general system operation. Control of the general system operation can include memory control and management, storage hardware (device) control and management, power control and management, and the like. Also, the OS program can perform a function of smoothing communication between various hardware (devices) and software constituent elements (programs). The communication program can enable communication with a computer, a server, a user device, and the like through the WC 115, the RFIC 116, or an external port.

The camera program can include a camera related software constituent element enabling camera related processes and functions. Under support of an API such as Open Graphics Library (OpenGL), DirectX and the like, the camera program can perform preprocessing applying various effects to an image from the image sensor of the camera 106 and postprocessing applying various effects to a captured snap image. If video data from the camera 106 reaches a transmission capacity (e.g., an available capacity of the memory 103 or a capacity of the buffer memory), the camera program can convert the video data into a video file, and transmit the converted video file to an external storage (e.g., a server, an external memory, or the like).

The graphical program can include various software constituent elements for providing and displaying graphics on the display 107. The graphical program can create graphics based on an API such as OpenGL, DirectX, and the like, and can provide various filters capable of applying various effects to an image. The term of graphics indicates a text, a web page, an icon, a digital image, a video, an animation, and the like. The graphical program can be an image viewer, an image edit program and the like adapting usability to postprocessing an image, and can be a camera related program, a video call related program, and the like optimized to preprocessing an image. The graphical program can perform postprocessing applying various effects to a rendering-completed image, or perform preprocessing applying various effects for an image. Filters for these effects can be collectively managed such that they can be used commonly to other programs as aforementioned.

The application program can include a browser, an electronic mail (e-mail), an instant message, word processing, keyboard emulation, an address book, a touch list, a widget, Digital Right Management (DRM), voice recognition, voice replication, a position determining function, a location based service, and the like. The user interface program can include various software constituent elements related to a user interface. The user interface program can include information about how a state of the user interface is changed, whether the change of the state of the user interface is carried out in which condition, and the like.

The CODEC program can include a software constituent element related to encoding and decoding of a video file.

The security program can pair with an AP, obtain at least one item of information about the AP, and set a security level according to the at least one item of information. The security program can set a lock of the user device according to the security level. The security program can release the lock of the user device according to the security level or maintain the lock of the user device or change the lock of the user device into other schemes. When a use restriction on the AP has been set, the security program can set the security level high and, when the use restriction on the AP has not been set, the security program can set the security level low. When a use restriction level set to the AP is high, the security program can set the security level high and, when the use restriction level set to the AP is low, the security program can set the security level low. When an encryption scheme (e.g., a password) for pairing with the AP has been set, the security program can decrease the security level and, when the encryption scheme for pairing with the AP has not been set, the security program can increase the security level. According to the coincidence or non-coincidence of a password for pairing with the AP with a password for releasing the lock of the user device, the security program can adjust the security level. On the basis of an RF signal of the AP, the security program can determine a Received Signal Strength Indication (RSSI). When the RSSI exceeds a threshold value, the security program can set the security level low and, when the RSSI does not exceed the threshold value, the security program can set the security level high. When a current location of the user device is included in an area set to the AP, the security program may set the security level low and, when the current location is not included in the area set to the AP, the security program may set the security level high. When a current time belongs to a time zone set to the AP, the security program may set the security level low and, when the current time does not belong to the time zone set to the AP, the security program may set the security level high.

Besides the aforementioned programs, the memory 103 can further include additional programs (instructions). Also, various functions of the user device 100 can be executed by hardware and/or software and/or a combination thereof, which may include one or more of stream processing and Application Specific Integrated Circuits (ASICs).

The speaker 104 can convert electrical signals into audible frequency band signals and output the audible frequency band signals. The microphone 105 can convert sound waves forwarded from human or other sound sources into electrical signals.

The camera 106 can convert light reflected from a camera target into electrical signals. The camera 106 can include an image sensor such as a Charged Coupled Device (CCD), a Complementary Metal-Oxide-Semiconductor (CMOS), or the like. The image sensor can perform a camera function of photo and video clip recording and the like. According to a camera program executed by the AP of the processor 101, the image sensor can change a hardware construction, for example, move a lens and adjust an F-number of the iris, and the like.

The display 107 can output electrical signals as visual information (e.g., a text, a graphic, a video, and the like). The display 107 may be one of an Electro Wetting Display (EWD), an Electronic paper (E-paper), a Plasma Display Panel (PDP), a Liquid Crystal Display (LCD), an Organic Light Emitting Diode (OLED), and an Active Matrix OLED (AMOLED).

The touch panel 108 can receive a touch input. The touch panel 108 may be one of a digitizer for stylus pen, a capacitive overlay touch panel, a resistance overlay touch panel, a surface acoustic wave touch panel, an infrared beam touch panel, and the like.

The sensor 109 can sense or distinguish and measure a physical quantity of heat, light, temperature, pressure, sound, position, or the like, or a change thereof. The sensor 109 can include a temperature sensor, a pressure sensor, a magnetic sensor, an optical sensor, an acoustic sensor, a capacitance sensor, a Global Positioning System (GPS) sensor, and the like.

The PMIC 110 can adjust power from the battery 111. For example, the processor 101 can transmit an interface signal dependent on a load to process, to the PMIC 110. Adaptively to the processor 101, the PMIC 110 can adjust a core voltage supplied to the processor 101, so the processor 101 can be driven all the time at a minimum power. The PMIC 110 can be constructed in relation to at least one of the WC 115, the memory 103, the speaker 104, the microphone 105, the camera 106, the display 107, the touch panel 108, etc., as well as the processor 101. One integrated PMIC is constructed, and the integrated PMIC may adjust a battery power related to at least one of the aforementioned constituent elements as well as the processor 101.

The FEM 113 can be a transmitting/receiving device capable of controlling an electric wave signal. The FEM 113 can connect the cellular antenna 112 and the RFIC 116 and divide transmission/reception signals. The FEM 113 can play a role of filtering and amplification. The FEM 113 may include a reception end FEM which embeds a filter filtering a reception signal, and a transmission end FEM which embeds a Power Amplifier Module (PAM) amplifying a transmission signal.

The WC 115 can perform various communication functions that the processor 101 does not process, for example, WiFi, BLUETOOTH, Near Field Communication (NFC), Universal Serial Bus (USB), GPS, and the like.

The RFIC (e.g., RF transceiver) 116 can receive an electric wave from a base station, and modulate a received high frequency into a low frequency (i.e., baseband frequency) such that the modem (e.g., the CP) can process the low frequency. The RFIC 116 can modulate a low frequency processed in the modem into a high frequency for transmission to the base station.

Figure 2:
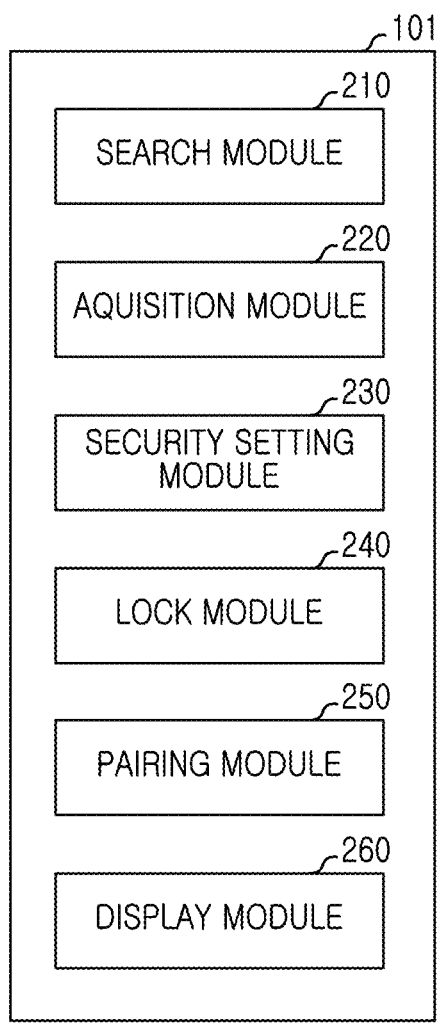
FIG. 2 is a block diagram illustrating a construction of an electronic device according to an embodiment of the present disclosure.

FIG. 2 is a block diagram illustrating a construction of an electronic device according to an embodiment of the present disclosure.

Referring to FIG. 2, the user device (e.g., electronic device 100) may include the processor 101 including a search module 210, an acquisition module 220, a security setting module 230, a lock module 240, a pairing module 250, and a display module 260.

The search module 210 can search for a network or an AP that can pair with the user device 100.

The acquisition module 220 can obtain at least one item of information about the network or AP searched by the search module 210. The at least one item of information about the AP may include use restriction information (e.g., a use restriction or not, or a use restriction level), RSSI, a location of the user device 100, a current time, previous pairing or non-pairing with the AP, a password for pairing with the AP, and the like. The acquisition module 220 may obtain the aforementioned information using the sensor 109.

According to the at least one item of information obtained by the acquisition module 220, the security setting module 230 can set a security level of the user device 100.

The lock module 240 can set lock of the user device suitable to the security level set by the security setting module 230. The lock module 240 can set a lock scheme suitable to the security level set by the security setting module 230. The lock scheme can be a lock using a password, a touch pattern, biometric recognition, or the like. When the security level is low, the lock module 240 can release the lock of the user device and, when the security level is high, the lock module 240 can execute the lock of the user device. When the security level is low, the lock module 240 can maintain an existing lock scheme (e.g., a password) and when the security level is high, the lock module 240 can change the lock scheme (e.g., the password) into other lock schemes of higher security (e.g., biometric recognition).

The pairing module 250 can pair with the AP searched by the search module 210. According to the at least one information obtained by the acquisition module 220, the pairing module 250 can set pairing with the AP. The at least one item of information may include one or more of the RSSI, a previous pairing or non-pairing with the AP, the location of the user device 100, the current time, and the like.

The display module 260 can display the result processed by the search module 210, the acquisition module 220, the security setting module 230, and the pairing module 250.

Figure 3:
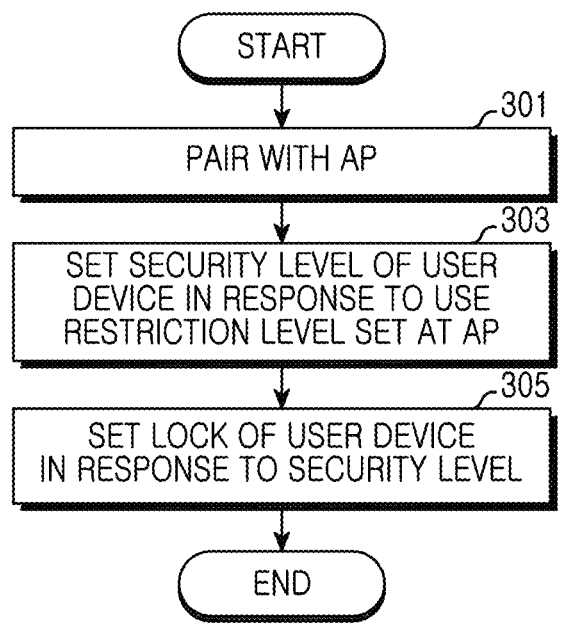
FIG. 3 is a flowchart illustrating a security setting procedure of a user device according to an embodiment of the present disclosure.

FIG. 3 is a flowchart illustrating a security setting procedure of a user device according to an embodiment of the present disclosure.

Referring to FIG. 3, in operation 301, the processor 101 (e.g., the pairing module 250) can perform pairing with an AP.

In operation 303, the processor 101 (e.g., the security setting module 230) can set a security level of the user device according to a use restriction level set at the AP. The use restriction level set at the AP can be obtained by the acquisition module 220.

In operation 305, the processor 101 (e.g., the lock module 250) can set a lock of the user device according to the security level. The processor 101 can set a lock scheme (e.g., a password, a touch pattern, biometric recognition, or the like) suitable to the security level, to the user device. When the security level is low, the processor 101 can release the lock of the user device, and when the security level is high, the processor 101 can execute the lock of the user device. When the security level is low, the processor 101 can maintain an existing lock scheme (e.g., a password), and when the security level is high, the processor 101 can change the previously used lock scheme (e.g., the password) into a lock scheme of higher security (e.g., biometric recognition).

Figure 4:
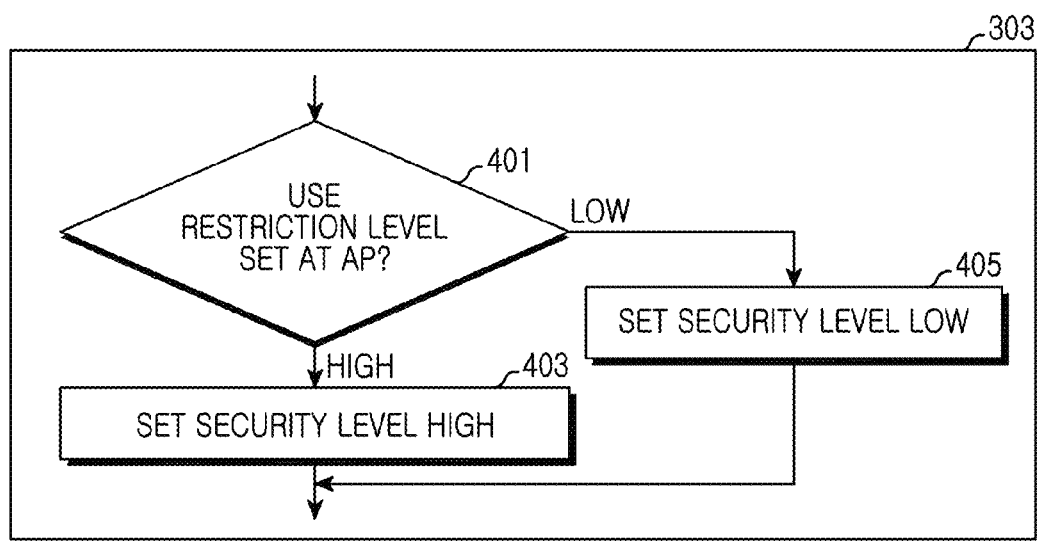
FIG. 4 is a flowchart illustrating a procedure of operation 303 of FIG. 3 according to an embodiment of the present disclosure.

FIG. 4 is a flowchart illustrating a procedure of operation 303 of FIG. 3 according to an embodiment of the present disclosure.

Referring to FIG. 4, in operation 401, the processor 101 (e.g., the security setting module 230) can determine whether a use restriction level set at an AP is high or low.

If the use restriction level set at the AP is high, in operation 403, the processor 101 (e.g., the security setting module 230) can set the security level high.

If the use restriction level set at the AP is low, in operation 405, the processor 101 (e.g., the security setting module 230) can set the security level low.

Figure 5:
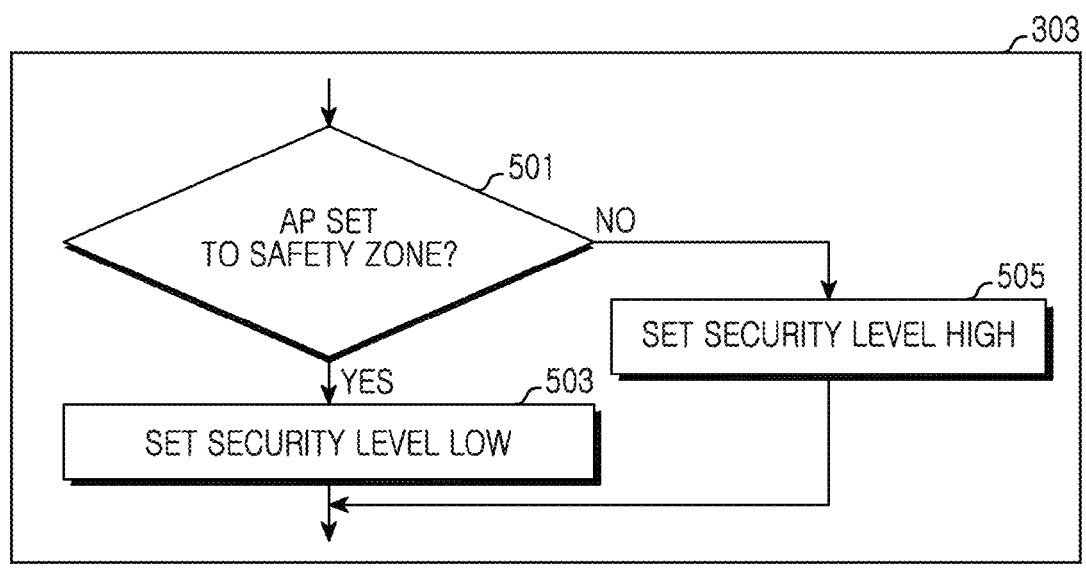
FIG. 5 is a flowchart illustrating a procedure of operation 303 of FIG. 3 according to an embodiment of the present disclosure.

FIG. 5 is a flowchart illustrating a procedure of operation 303 of FIG. 3 according to an embodiment of the present disclosure.

Referring to FIG. 5, in operation 501, the processor 101 (e.g., the security setting module 230) can identify whether it is an AP set to a safety zone.

If it is the AP set to the safety zone, in operation 503, the processor 101 (e.g., the security setting module 230) can set the security level low.

If it is the AP not set to the safety zone, in operation 505, the processor 101 (e.g., the security setting module 230) can set the security level high.

Figure 6:
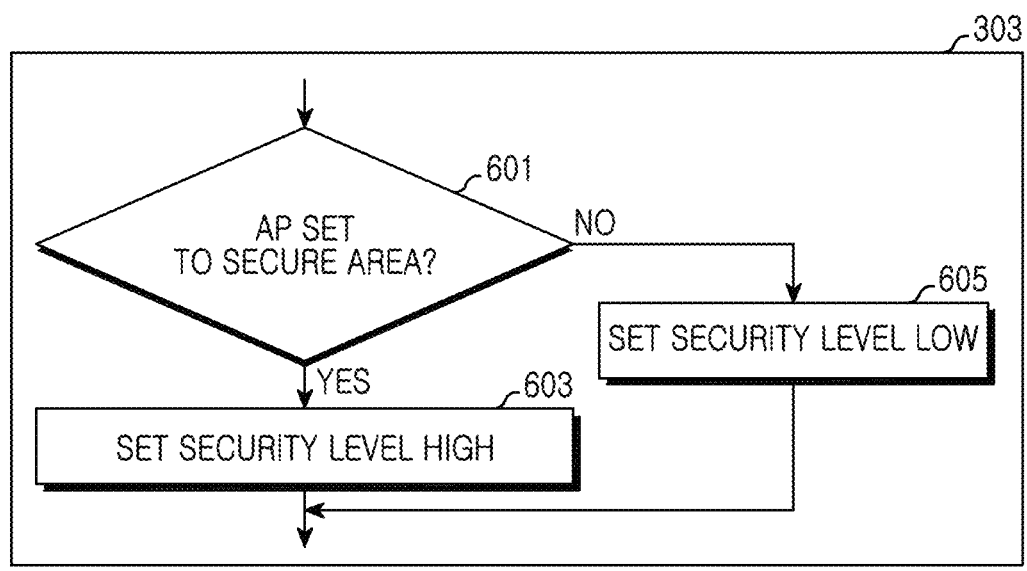
FIG. 6 is a flowchart illustrating a procedure of operation 303 of FIG. 3 according to an embodiment of the present disclosure.

FIG. 6 is a flowchart illustrating a procedure of operation 303 of FIG. 3 according to an embodiment of the present disclosure.

Referring to FIG. 6, in operation 601, the processor 101 (e.g., the security setting module 230) can identify whether it is an AP set to a secure area.

If it is the AP set to the secure area, in operation 603, the processor 101 (e.g., the security setting module 230) can set the security level high.

If it is the AP not set to the secure area, in operation 605, the processor 101 (e.g., the security setting module 230) can set the security level low.

Figure 7:
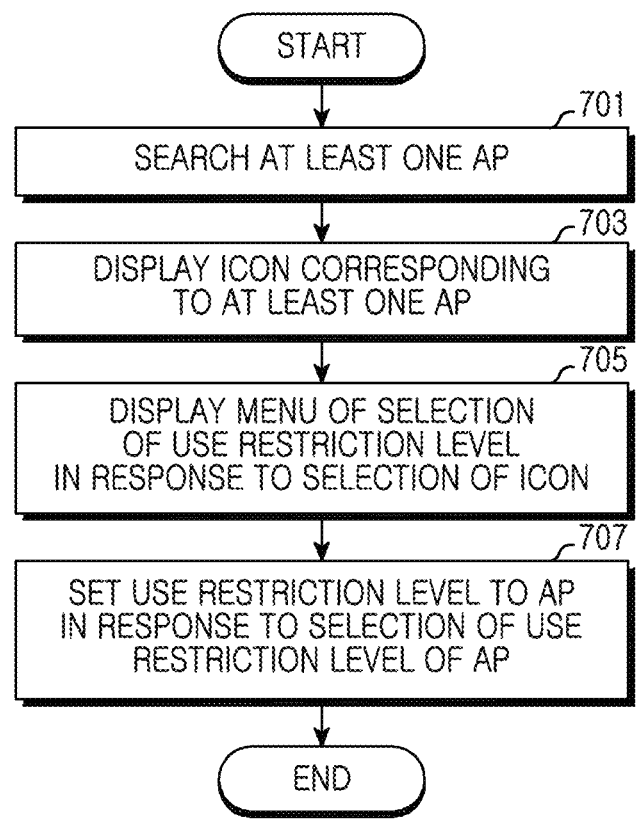
FIG. 7 is a flowchart illustrating a procedure of setting a use restriction level of an Access Point (AP) according to an embodiment of the present disclosure.

FIG. 7 is a flowchart illustrating a procedure of setting a use restriction level of an AP according to an embodiment of the present disclosure.

Referring to FIG. 7, in operation 701, the processor 101 (e.g., the search module 210) can search at least one pairable AP.

In operation 703, the processor 101 (e.g., the display module 260) can display an icon corresponding to the searched at least one AP.

According to the selection of the icon, in operation 705, the processor 101 (e.g., the display module 260) can display a menu for selecting a use restriction level of the AP.

According to the selection of the use restriction level of the AP, in operation 707, the processor 101 (e.g., the security setting module 230) can set the use restriction level to the AP.

Figure 8:
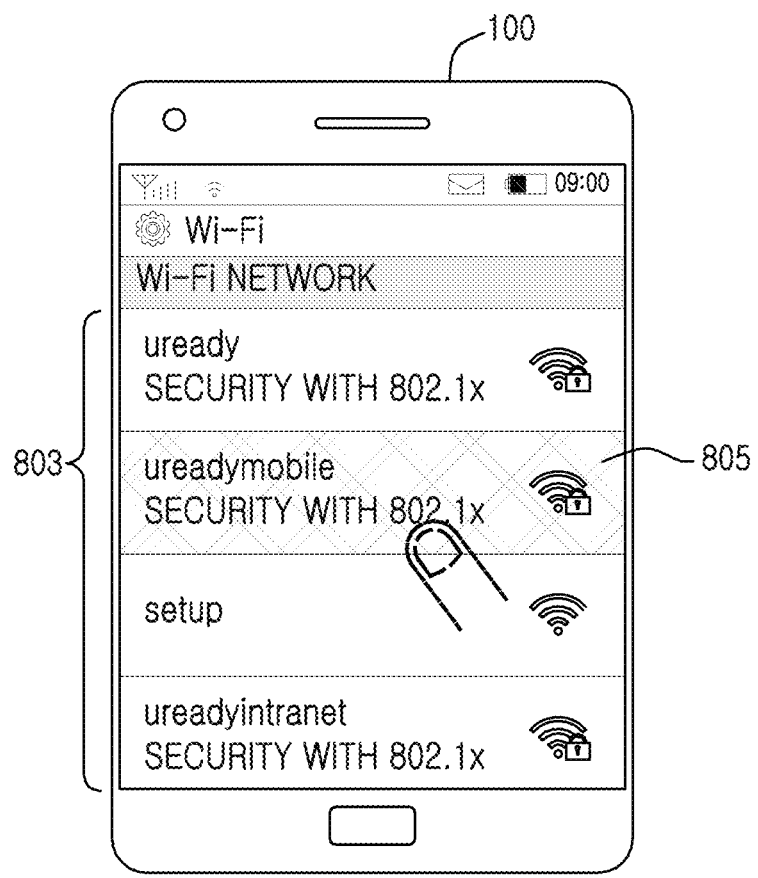
FIGS. 8, 9, and 10 are screens illustrating a procedure of setting a use restriction level of an AP according to an embodiment of the present disclosure.
Figure 9:
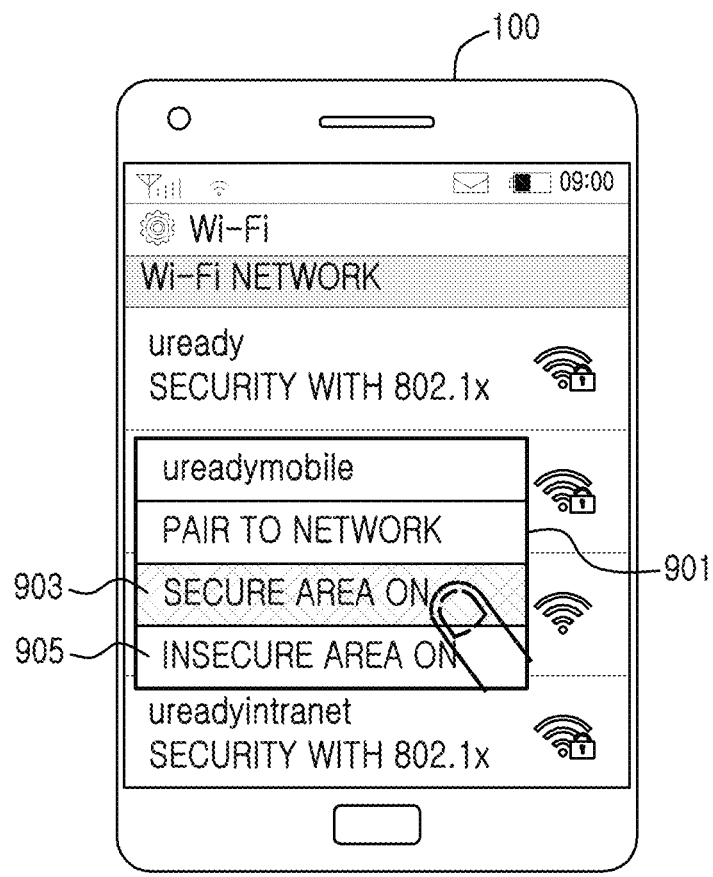
Figure 10:
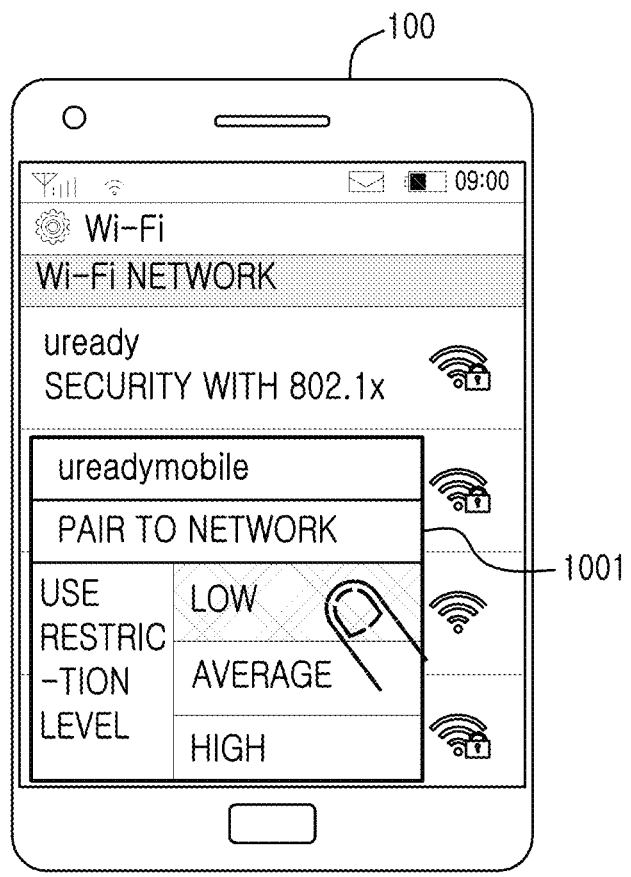

FIGS. 8 to 10 are screens illustrating a procedure of setting a use restriction level of an AP according to an embodiment of the present disclosure.

Referring to FIG. 8, the user device 100 can search at least one AP pairable with the user device 100, and display icons 803 corresponding to the searched at least one AP. If a user selects an icon 805 among the icons 803, the user device 100 can provide a screen of FIG. 9 or FIG. 10.

Referring to FIG. 9, according to the selection of the icon 805, the user device 100 can display a menu 901 for selecting a use restriction level of the AP. For example, the menu 901 can include an icon 903 indicating a secure area and an icon 905 indicating an insecure area. If the user selects one of the icon 903 indicating the secure area and the icon 905 indicating the insecure area, the user device 100 can set a use restriction level corresponding to the selected icon, to the AP.

Referring to FIG. 10, according to the selection of the icon 805, the user device 100 can display a menu 1001 for selecting a use restriction level of the AP. For example, the menu 1001 can display icons (e.g., low, average, and high) divided by use restriction level.

Although not illustrated, according to icon selection, the user device 100 may display a menu for enabling the user to set use information about the AP, for example, an area, a time zone, or the like.

Figure 11:
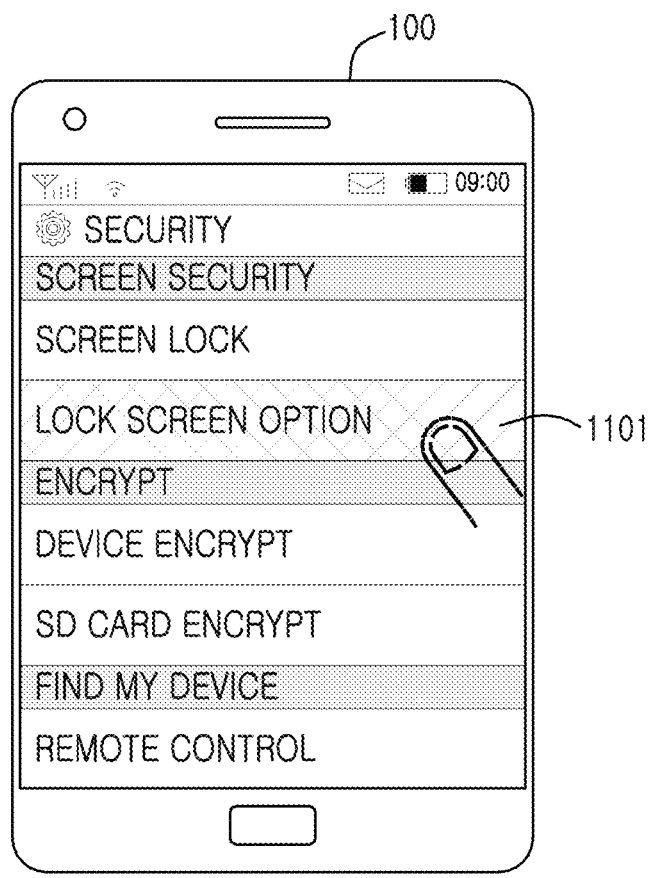
FIGS. 11, 12, and 13 are screens illustrating a procedure of setting a lock screen according to an embodiment of the present disclosure.
Figure 12:
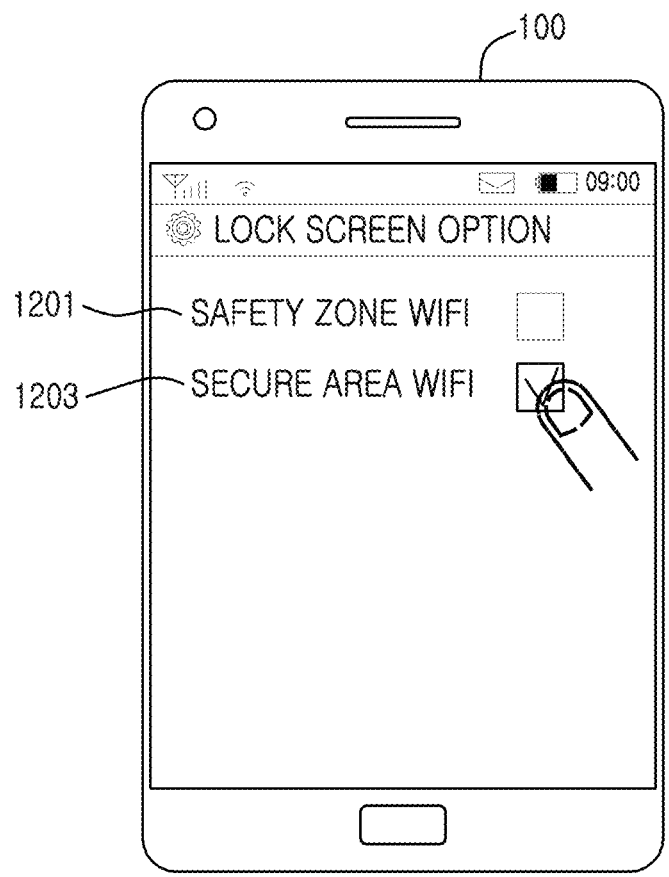
Figure 13:
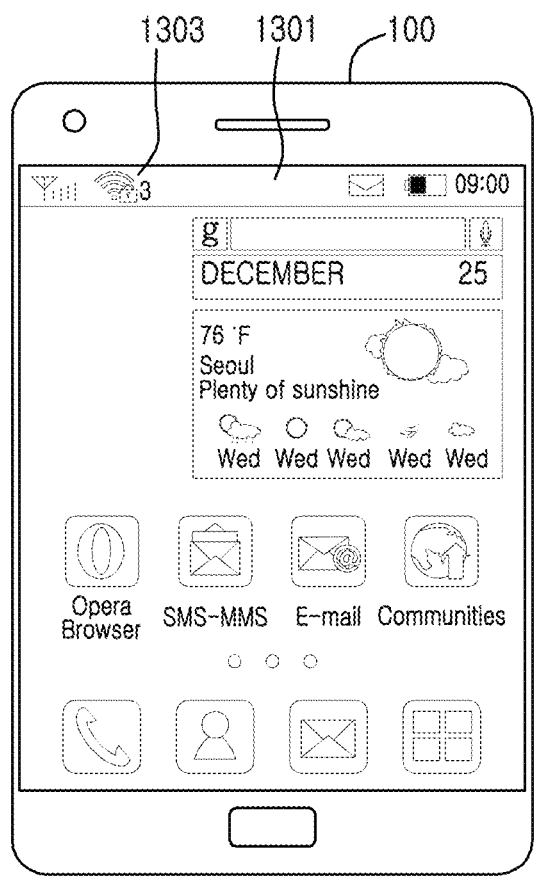

FIGS. 11 to 13 are screens illustrating a procedure of setting a lock screen according to an embodiment of the present disclosure.

Referring to FIG. 11, the user device 100 can display an icon 1101 for execution of lock screen option. If a user selects the icon 1101, the user device 100 can provide a screen of FIG. 12.

Referring to FIG. 12, according to the execution of the lock screen option, the user device 100 can display an icon 1201 indicating safety zone WiFi and an icon 1203 indicating secure area WiFi. If the user selects one of the icon 1201 indicating the safety zone WiFi and the icon 1203 indicating the secure area WiFi, the user device 100 can provide a screen of FIG. 13.

Referring to FIG. 13, according to the selection of the icon 1201 or 1203, the user device 100 can set a lock level of the user device 100 on the basis of an AP to which a use restriction (e.g., a safety zone or secure area) is preset, and can display status information 1303 in a status display bar 1301.

Figure 14:
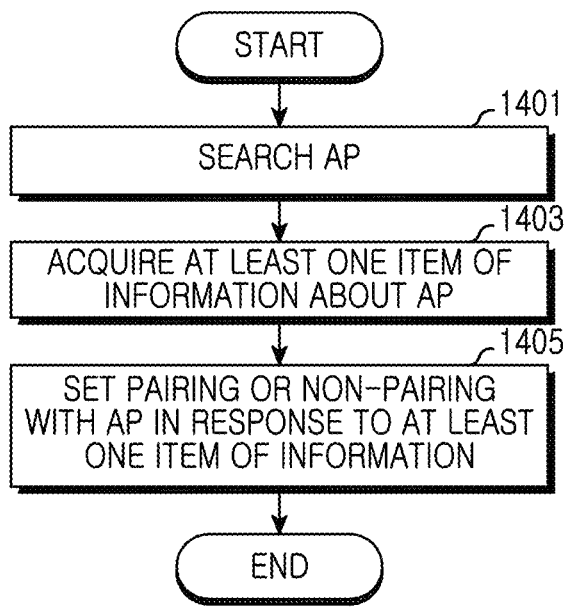
FIG. 14 is a flowchart illustrating an AP pairing procedure of a user device according to an embodiment of the present disclosure.

FIG. 14 is a flowchart illustrating an AP pairing procedure of a user device according to an embodiment of the present disclosure.

Referring to FIG. 14, in operation 1401, the processor 101 (e.g., the search module 210) can search an AP.

In operation 1403, the processor 101 (e.g., the acquisition module 220) can acquire at least one item of information about the searched AP. The at least one item of information about the AP can include an RSSI, a location of the user device, a current time, a previous pairing or non-pairing with the AP, and the like.

In operation 1405, according to the acquired at least one item of information, the processor 101 (e.g., the pairing module 250) can set pairing or non-pairing with the AP. If the RSSI exceeds a threshold value, the processor 101 can pair with the AP. If the location of the user device is included in an area set to the AP, the processor 101 can pair with the AP. If the current time is included in a time zone set to the AP, the processor 101 can pair with the AP. If the AP has ever been paired previously, the processor 101 can pair with the AP. If the acquired at least one item of information is equal to or greater than a reference with information set to the AP, the processor 101 can pair with the AP.

Figure 15:
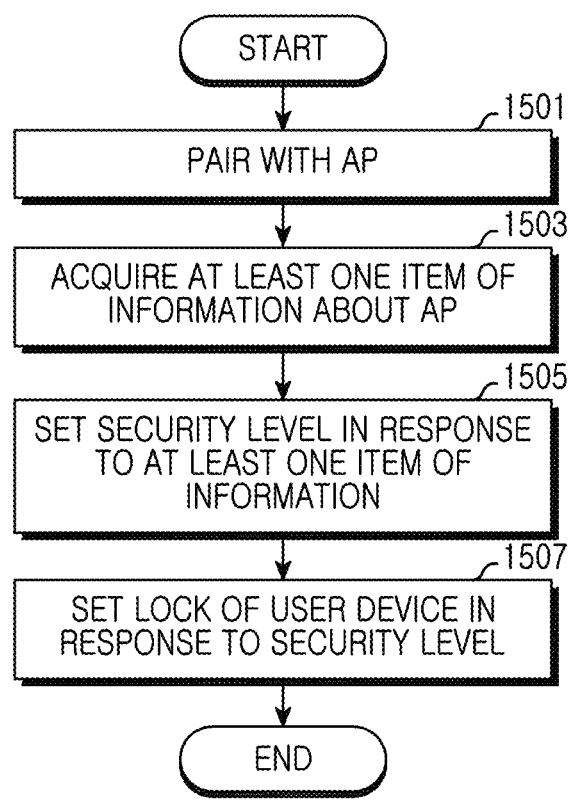
FIG. 15 is a flowchart illustrating a security setting procedure of a user device according to an embodiment of the present disclosure.

FIG. 15 is a flowchart illustrating a security setting procedure of a user device according to an embodiment of the present disclosure.

Referring to FIG. 15, in operation 1501, the processor 101 (e.g., the pairing module 250) can pair with an AP. By performing the aforementioned procedure of FIG. 14, the processor 101 can pair with the AP.

In operation 1503, the processor 101 (e.g., the acquisition module 220) can acquire at least one item of information about the AP. The at least one item of information about the AP can include use restriction information (e.g., a use restriction or not, or a use restriction level), an RSSI, a location of the user device, a current time, a previous pairing or non-pairing with the AP, a password necessary for pairing with the AP, and the like.

In operation 1505, according to the at least one item of information, the processor 101 (e.g., the security setting module 230) can set a security level. For example, if a use restriction on the AP is set (e.g., a secure area), the processor 101 can set the security level high and, if the use restriction on the AP is not set (e.g., a safety zone), the processor 101 can set the security level low. If a user restriction level of the AP is set high, the processor 101 can set the security level high, and if the use restriction level of the AP is set low, the processor 1101 can set the security level low.

In operation 1507, the processor 101 (e.g., the lock module 250) can set a lock of the user device according to the security level. The processor 101 can set a lock scheme (e.g., a password, a touch pattern, biometric recognition, or the like) suitable to the security level, to the user device. When the security level is low, the processor 101 can release the lock of the user device, and when the security level is high, the processor 101 can execute the lock of the user device. When the security level is low, the processor 101 can maintain an existing lock scheme (e.g., a password), and when the security level is high, the processor 101 can change the previously used lock scheme (e.g., the password) into a lock scheme of higher security (e.g., biometric recognition).

Figure 16:
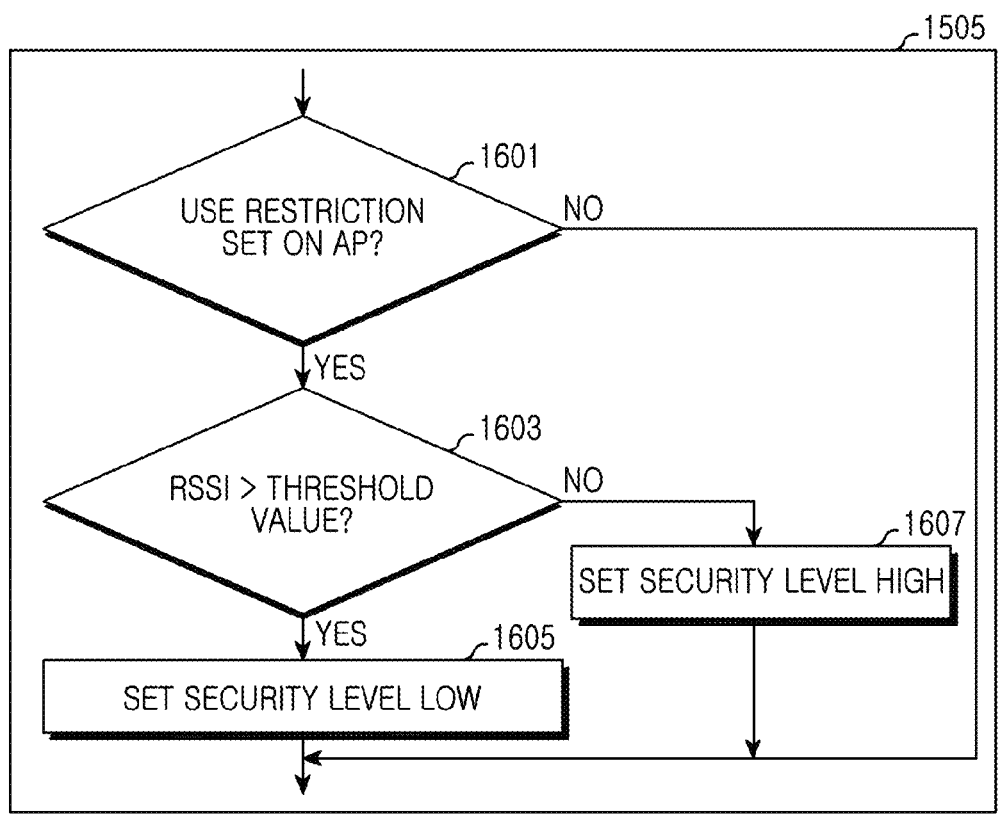
FIG. 16 is a flowchart illustrating a procedure of operation 1505 of FIG. 15 according to an embodiment of the present disclosure.

FIG. 16 is a flowchart illustrating a procedure of operation 1505 of FIG. 15 according to an embodiment of the disclosure.

Referring to FIG. 16, in operation 1601, the processor 101 (e.g., the security setting module 230) can identify if a use restriction on an AP has been set.

If the use restriction on the AP has been set, in operation 1603, the processor 101 (e.g., the security setting module 230) can identify whether an RSSI exceeds a threshold value. The RSSI can be obtained by the acquisition module 220.

If the RSSI exceeds the threshold value, in operation 1605, the processor 101 (e.g., the security setting module 230) can set a security level low.

If the RSSI does not exceed the threshold value, in operation 1607, the processor 101 (e.g., the security setting module 230) can set the security level high.

Figure 17:
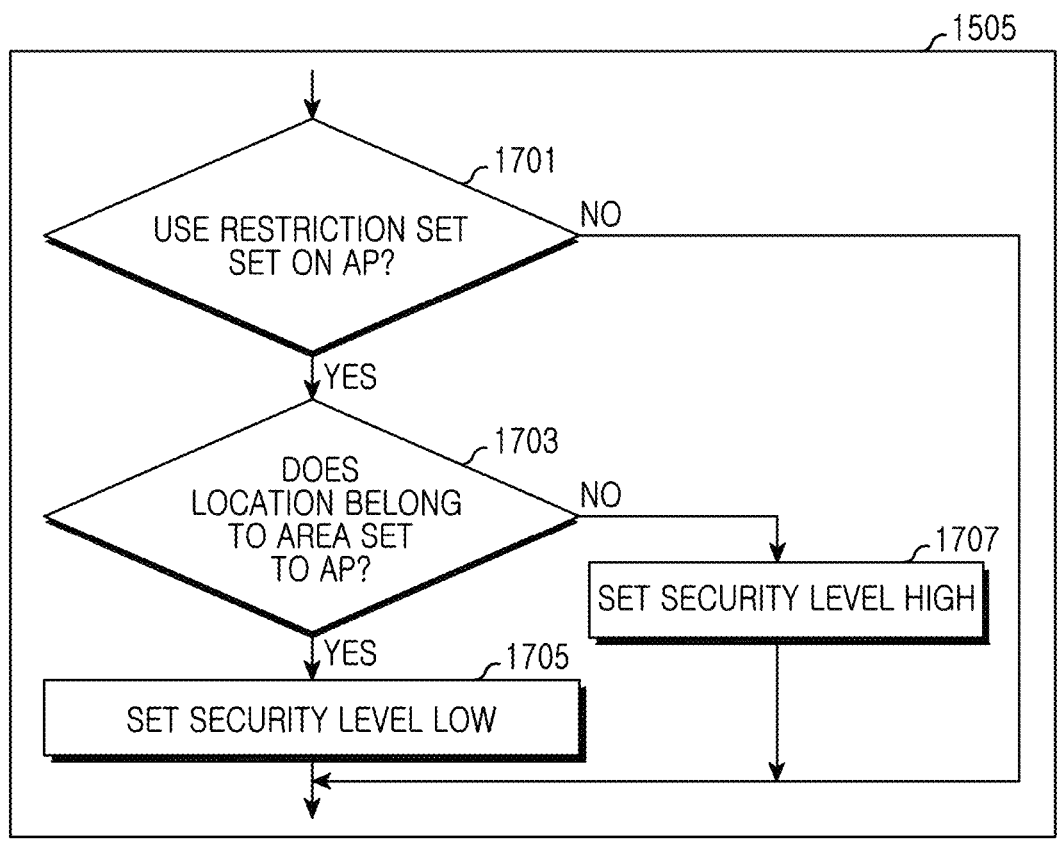
FIG. 17 is a flowchart illustrating a procedure of operation 1505 of FIG. 15 according to an embodiment of the present disclosure.

FIG. 17 is a flowchart illustrating a procedure of operation 1505 of FIG. 15 according to an embodiment of the present disclosure.

Referring to FIG. 17, in operation 1701, the processor 101 (e.g., the security setting module 230) can identify if a use restriction on an AP has been set.

If the use restriction on the AP has been set, in operation 1703, the processor 101 (e.g., the security setting module 230) can identify if a location of a user device belongs to an area set to the AP. The acquisition module 220 can obtain the location of the user device using the sensor 109.

If the location of the user device belongs to the area set to the AP, in operation 1705, the processor 101 (e.g., the security setting module 230) can set a security level low.

If the location of the user device does not belong to the area set to the AP, in operation 1707, the processor 101 (e.g., the security setting module 230) can set the security level high.

Figure 18:
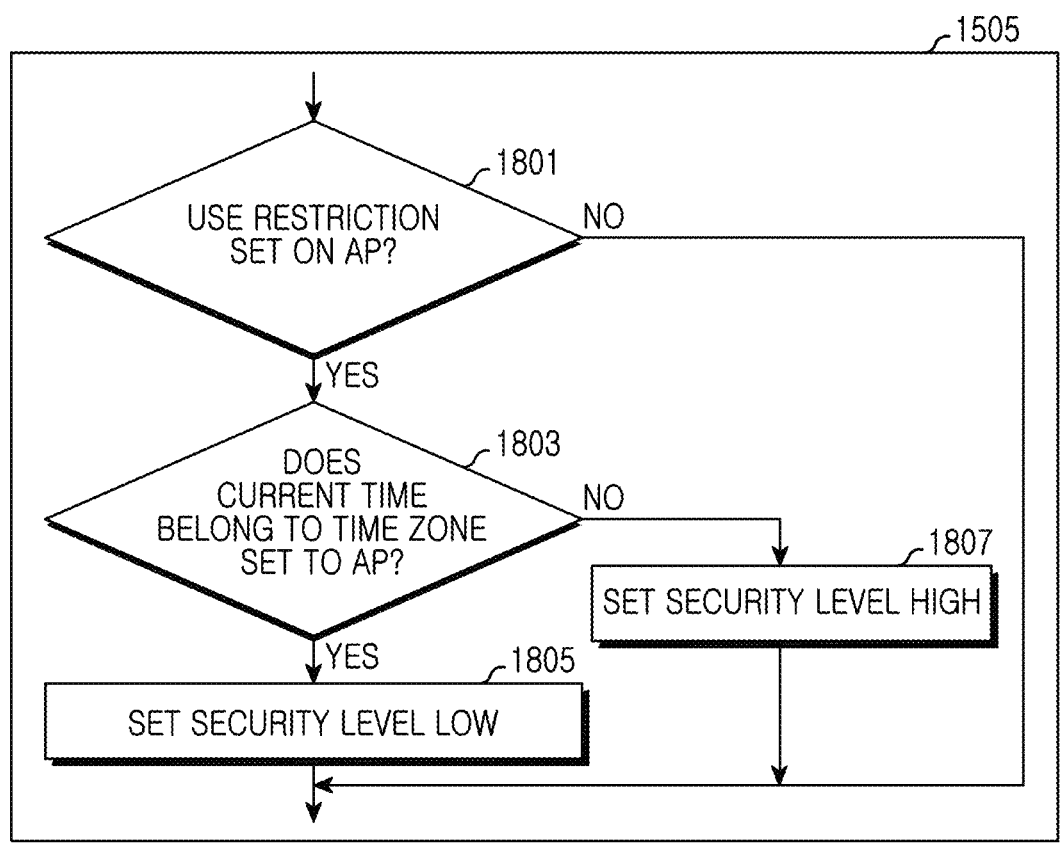
FIG. 18 is a flowchart illustrating a procedure of operation 1505 of FIG. 15 according to an embodiment of the present disclosure.

FIG. 18 is a flowchart illustrating a procedure of operation 1505 of FIG. 15 according to an embodiment of the present disclosure.

Referring to FIG. 18, in operation 1801, the processor 101 (e.g., the security setting module 230) can identify if a use restriction on an AP has been set.

If the use restriction on the AP has been set, in operation 1803, the processor 101 (e.g., the security setting module 230) can identify if a current time belongs to a time zone set to the AP.

If the current time belongs to the time zone set to the AP, in operation 1805, the processor 101 (e.g., the security setting module 230) can set a security level low.

If the current time does not belong to the time zone set to the AP, in operation 1807, the processor 101 (e.g., the security setting module 230) can set the security level high.

Figure 19:
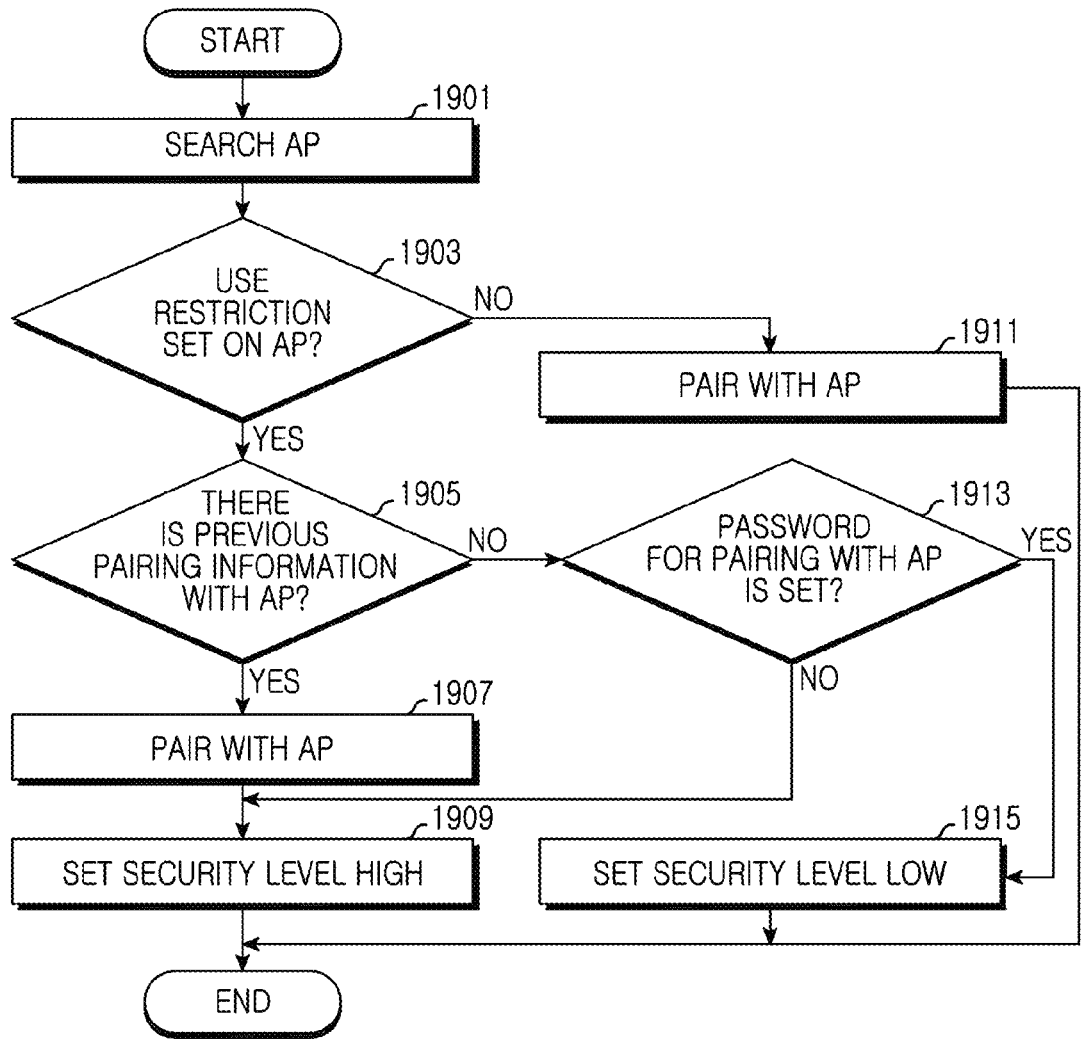
FIG. 19 is a flowchart illustrating a security setting procedure of a user device according to an embodiment of the present disclosure.

FIG. 19 is a flowchart illustrating a security setting procedure of a user device according to an embodiment of the present disclosure.

Referring to FIG. 19, in operation 1901, the processor 101 (e.g., the search module 210) can search an AP pairable with the user device.

In operation 1903, the processor 101 (e.g., the security setting module 230) can identify if a use restriction on the AP has been set. This information can be obtained by the acquisition module 220.

If the use restriction on the AP has not been set, in operation 1911, the processor 101 (e.g., the pairing module 250) can pair with the AP.

If the use restriction on the AP has been set, in operation 1905, the processor 101 (e.g., the security setting module 230) can identify if there is previous pairing information with the AP. This information can be obtained by the acquisition module 220.

If there is the previous pairing information with the AP, in operation 1907, the processor 101 (e.g., the pairing module 250) can pair with the AP.

In operation 1909, the processor (e.g., the security setting module 230) can set a security level high.

If there is not the previous pairing information with the AP, in operation 1913, the processor 101 (e.g., the security setting module 230) can identify whether an encryption scheme (e.g., a password) for pairing with the AP has been set. This information can be obtained by the acquisition module 220.

If the password for pairing with the AP has been set, in operation 1915, the processor 101 (e.g., the security setting module 230) can set the security level low.

If the password for pairing with the AP has not been set, in operation 1909, the processor 101 (e.g., the security setting module 230) can set the security level high.

Figure 20:
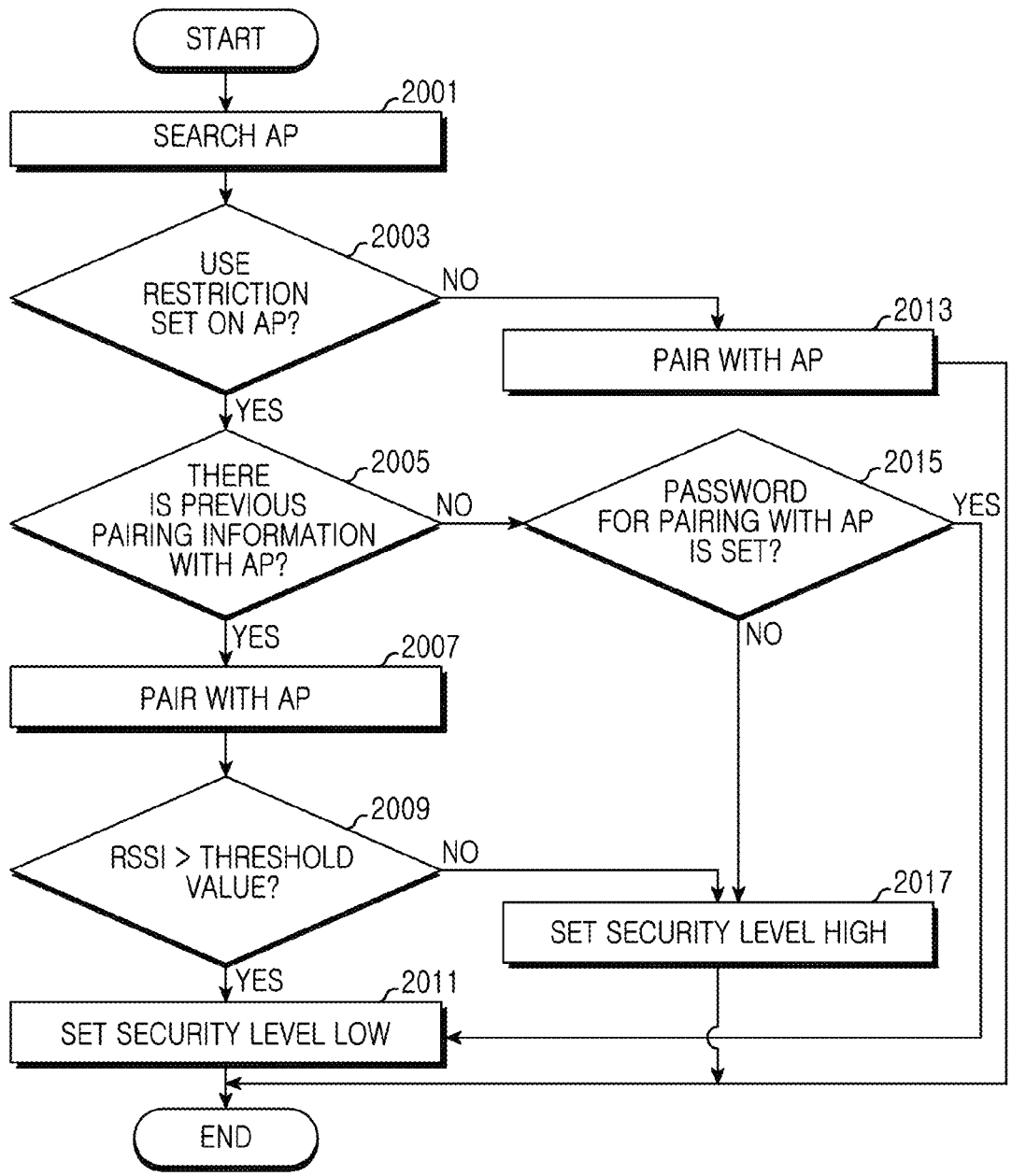
FIG. 20 is a flowchart illustrating a security setting procedure of a user device according to an embodiment of the present disclosure.

FIG. 20 is a flowchart illustrating a security setting procedure of a user device according to an embodiment of the present disclosure.

Referring to FIG. 20, in operation 2001, the processor 101 (e.g., the search module 210) can search an AP pairable with the user device.

In operation 2003, the processor 101 (e.g., the security setting module 230) can identify if a use restriction on the AP has been set. This information can be obtained by the acquisition module 220.

If the use restriction on the AP has not been set, in operation 2013 the processor 101 (e.g., the pairing module 250) can pair with the AP.

If the use restriction on the AP has been set, in operation 2005, the processor 101 (e.g., the security setting module 230) can identify if there is previous pairing information with the AP. This information can be obtained by the acquisition module 220.

If there is the previous pairing information with the AP, in operation 2007, the processor 101 (e.g., the pairing module 250) can pair with the AP.

In operation 2009, the processor (e.g., the security setting module 230) can identify if an RSSI exceeds a threshold value. The RSSI can be measured by the acquisition module 220.

If the RSSI exceeds the threshold value, in operation 2011, the processor 101 (e.g., the securing setting module 230) can set a security level low.

If the RSSI does not exceed the threshold value, in operation 2017, the processor 101 (e.g., the securing setting module 230) can set the security level high.

If there is not the previous pairing information with the AP, in operation 2015, the processor 101 (e.g., the security setting module 230) can identify whether a password for pairing with the AP has been set. The password necessary for pairing with the AP can be obtained by the acquisition module 220.

If the password for pairing with the AP has been set, in operation 2011, the processor 101 (e.g., the security setting module 230) can set the security level low.

If the password for pairing with the AP has not been set, in operation 2017, the processor 101 (e.g., the security setting module 230) can set the security level high.

Figure 21:
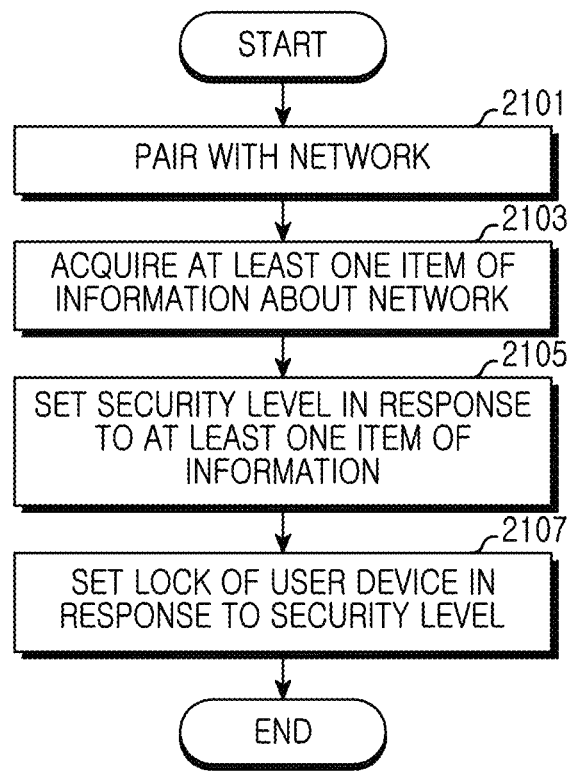
FIG. 21 is a flowchart illustrating a security setting procedure of a user device according to an embodiment of the present disclosure.

FIG. 21 is a flowchart illustrating a security setting procedure of a user device according to an embodiment of the present disclosure.

Referring to FIG. 21, in operation 2101, the processor 101 (e.g., the pairing module 250) can pair with a network.

In operation 2103, the processor 101 (e.g., the acquisition module 220) can acquire at least one item of information about the network. The at least one item of information about the network can include use restriction information (e.g., a use restriction or not, or a use restriction level) about the network, an RSSI, a location of the user device, a current time, a previous pairing or non-pairing with the network, a password necessary for pairing with the network, and the like.

In operation 2105, according to the at least one item of information, the processor 101 (e.g., the security setting module 230) can set a security level. For example, if a user restriction level of the network is set high, the processor 101 can set the security level high and, if the use restriction level of the network is set low, the processor 1101 can set the security level low.

In operation 2107, the processor 101 (e.g., the lock module 250) can set a lock of the user device according to the security level. The processor 101 can set a lock scheme (e.g., a password, a touch pattern, biometric recognition, or the like) suitable to the security level, to the user device. When the security level is low, the processor 101 can release the lock of the user device, and when the security level is high, the processor 101 can execute the lock of the user device. When the security level is low, the processor 101 can maintain an existing lock scheme (e.g., a password), and when the security level is high, the processor 101 can change the previously used lock scheme (e.g., the password) into a lock scheme of higher security (e.g., biometric recognition).

Figure 22:
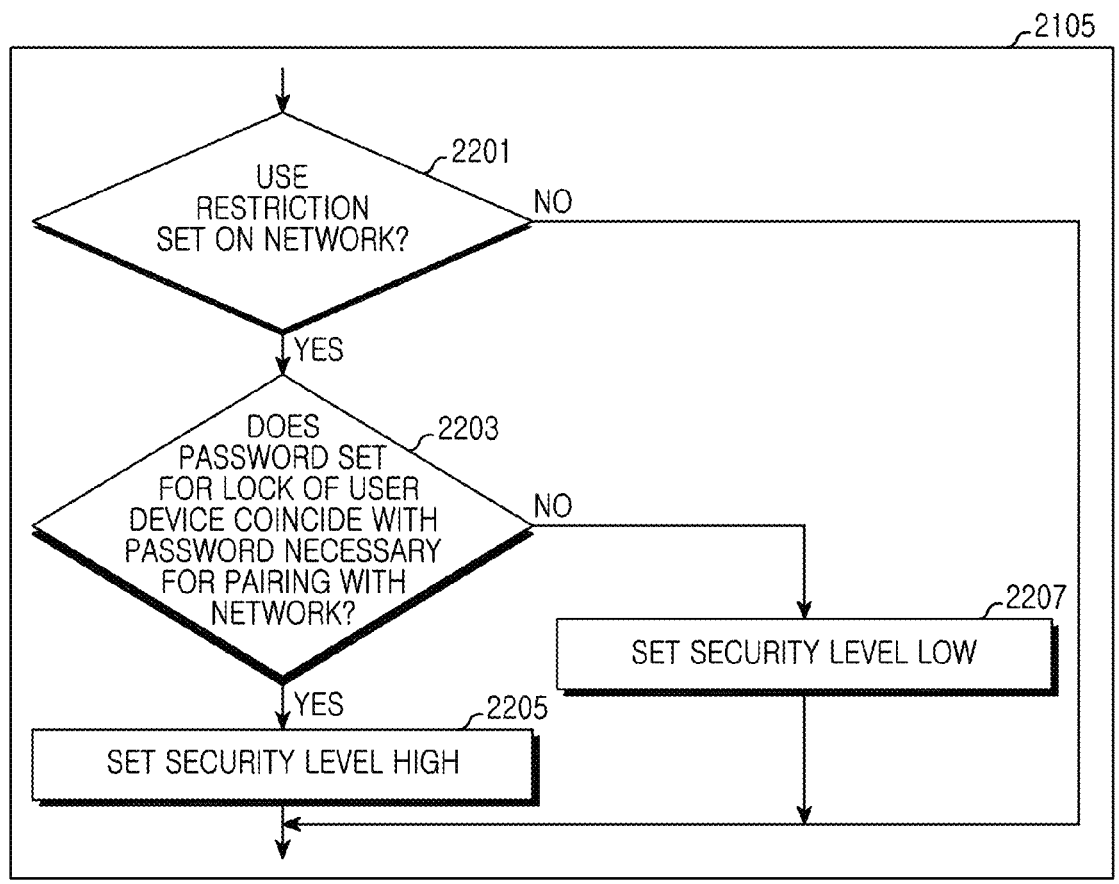
FIG. 22 is a flowchart illustrating a procedure of operation 2105 of FIG. 21 according to an embodiment of the present disclosure.

FIG. 22 is a flowchart illustrating a procedure of operation 2105 of FIG. 21 according to an embodiment of the present disclosure.

Referring to FIG. 22, in operation 2201, the processor 101 (e.g., the security setting module 230) can identify if a use restriction on a network has been set.

If the use restriction on the network has been set, in operation 2203, the processor 101 (e.g., the security setting module 230) can identify if a password set for lock of the user device 100 coincides with a password necessary for pairing with the network.

If the password set for the lock of the user device 100 does not coincide with the password necessary for pairing with the network, in operation 2207, the processor 101 (e.g., the security setting module 230) can set a security level low.

If the password set for the lock of the user device 100 coincides with the password necessary for pairing with the network, in operation 2205, the processor 101 (e.g., the security setting module 230) can set the security level high.

Figure 23:
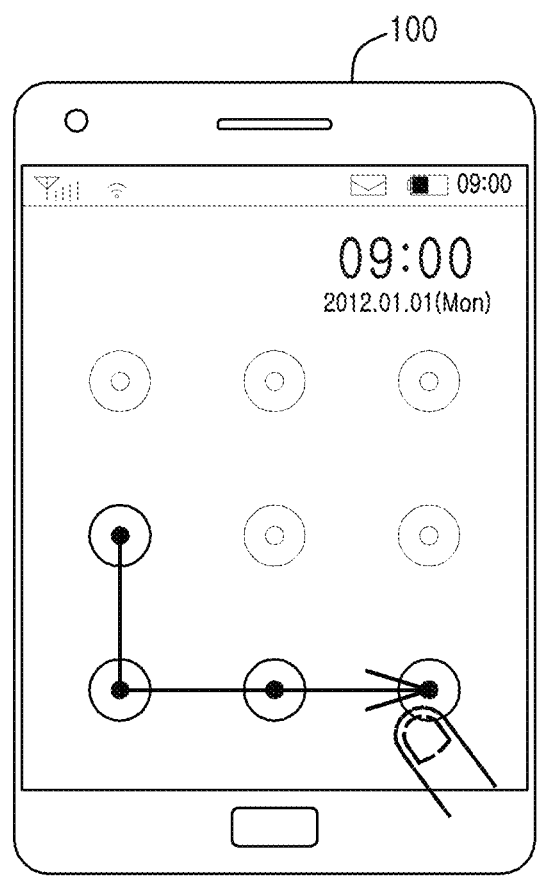
FIGS. 23, 24, and 25 are diagrams illustrating lock screens according to an embodiment of the present disclosure.
Figure 24:
Figure 25:

FIGS. 23 to 25 are diagrams illustrating lock screens according to an embodiment of the present disclosure. The user device 100 can provide a lock screen suitable to a security level that is set to the user device 100.

Referring to FIG. 23, the user device 100 can provide a lock screen of a touch pattern scheme. If a user inputs a touch pattern joining predefined pointers together through touch and drag operations, the user device 100 can release the lock of the user device 100.

Referring to FIG. 24, the user device 100 can provide a lock screen of a password scheme. If the user inputs a correct password to the user device 100, the user device 100 can release the lock of the user device 100.

Referring to FIG. 25, the user device 100 can provide a lock screen of a Personal Identification Number (PIN) scheme. If the user inputs a correct PIN, the user device 100 can release lock of the user device 100.

Though not illustrated, the user device 100 may provide a lock screen using biometric recognition (e.g., voice recognition, fingerprint recognition, iris recognition, face recognition, or the like).

As described above, a user device can set a security level high or low according to at least one information (e.g., use restriction information) on an AP pairing with the user device. The user device provides a lock scheme (e.g., password, biometric recognition, or the like) suitable to the security level, and adjusts the security level for use of wireless communication through the paired AP, thereby being able to satisfy a user's convenience.

According to various embodiments of the present disclosure, respective modules can be configured by software, firmware, hardware or a combination thereof Also, some or all of the modules may be constructed in one entity, and can identically perform a function of each module. According to various embodiments of the present disclosure, respective operations can be executed sequentially, repeatedly, or in parallel. Also, some of the operations can be omitted or other operations can be added and executed. For example, the respective operations can be executed by corresponding modules described in the present disclosure.

Methods according to various embodiments disclosed in the claims and/or specification of the present disclosure can be implemented in a form of hardware, software, or a combination of the hardware and the software, for a general purpose or a specialized processor to be configured to execute an embodiment of the present disclosure.

In a case of implementing in the software form, a computer readable storage medium storing one or more programs (i.e., software modules) may be provided. One or more programs stored in the computer readable storage medium are executable by one or more processors within an electronic device. The one or more programs may include instructions for enabling the electronic device to execute the methods according to the various embodiments disclosed in the claims and/or specification of the present disclosure.

These programs (i.e., software modules or software) can be stored in a Random Access Memory (RAM), a nonvolatile memory including a flash memory, a Read Only Memory (ROM), an Electrically Erasable Programmable ROM (EEPROM), a magnetic disk storage device, a Compact Disk ROM (CD-ROM), a Digital Versatile Disk (DVD) or an optical storage device of other form, and a magnetic cassette. Or, the programs can be stored in a memory configured by a combination of some or all of the foregoing. Also, each configuration memory may be plural in number.

Also, the programs can be stored in an attachable storage device accessible to the electronic device through a communication network such as the Internet, an intranet, a Local Area Network (LAN), a Wireless LAN (WLAN) and a Storage Area Network (SAN), or a communication network configured by a combination of the foregoing. This storage device can access the electronic device through an external port.

Also, a separate storage device on a communication network may access a portable electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling a lock function in an electronic device, the method comprising:
pairing the electronic device with an Access Point (AP);
obtaining information about the AP from the AP via the pairing;
determining a security level of the electronic device based on the obtained information; and
performing one of locking the electronic device and unlocking the electronic device,
wherein the locking of the electronic device includes selecting one lock type, which corresponds to the determined security level, of one or more lock types, and applying the selected one lock type to the locking of the electronic device.

2. The method of claim 1, wherein the information about the AP comprises a setting or non-setting of a use restriction on the AP, and
wherein the determining of the security level of the electronic device based on the obtained information includes setting the security level high if there exists the setting of the use restriction on the AP, and setting the security level low if there does not exist the setting of the use restriction on the AP.

3. The method of claim 1, wherein the information about the AP comprises a use restriction level of the AP, and
wherein the determining of the security level of the electronic device based on the obtained information includes setting the security level high if the use restriction level of the AP is high, and setting the security level low if the use restriction level of the AP is low.

4. The method of claim 1, wherein the information about the AP comprises information of whether an encryption scheme for pairing with the AP has been set, and
wherein the determining of the security level of the electronic device based on the obtained information includes decreasing the security level if the encryption scheme has been set, and increasing the security level if the encryption scheme has not been set.

5. The method of claim 1, wherein the information about the AP comprises a password for pairing with the AP, and
wherein the determining of the security level of the electronic device based on the obtained information includes adjusting the security level according to a coincidence or non-coincidence of the password for pairing with the AP with a password necessary for releasing a lock of the electronic device.

6. The method of claim 1, wherein the information about the AP comprises a Radio Frequency (RF) signal of the AP, and
wherein the determining of the security level of the electronic device based on the obtained information includes determining a Received Signal Strength Indication (RSSI) on a basis of the RF signal, and setting the security level according to a comparison result between the RSSI and a threshold value.

7. The method of claim 1, wherein the information about the AP comprises a location of the electronic device or a current time, and
wherein the determining of the security level of the electronic device based on the obtained information includes setting the security level according to whether the location or current time belongs to an area or time zone set to the AP.

8. An electronic device comprising:
a wireless communication module; and
a processor configured to control to:
pair the electronic device with an Access Point (AP) via the wireless communication module;
obtain information about the AP from the AP via the pairing;
determine a security level of the electronic device based on the obtained information; and
perform one of locking the electronic device and unlocking the electronic device,
wherein the locking of the electronic device includes selecting one lock type, which corresponds to the security level, of one or more lock types, and applying the selected one lock type to the locking of the electronic device.

9. The electronic device of claim 8, wherein the information about the AP comprises a setting or non-setting of a use restriction on the AP, and
wherein the processor is further configured to control to set the security level high if there exists the setting of the use restriction on the AP, and set the security level low if there does not exist the setting of the use restriction on the AP.

10. The electronic device of claim 8, wherein the information about the AP comprises a use restriction level of the AP, and
wherein the processor is further configured to control to set the security level high if the use restriction level of the AP is high, and set the security level low if the use restriction level of the AP is low.

11. The electronic device of claim 8, wherein the information about the AP comprises information of whether an encryption scheme for pairing with the AP has been set, and
wherein the processor is further configured to control to decrease the security level if the encryption scheme has been set, and increase the security level if the encryption scheme has not been set.

12. The electronic device of claim 8, wherein the information about the AP comprises a password for pairing with the AP, and
wherein the processor is further configured to control to adjust the security level according to a coincidence or non-coincidence of the password for pairing with the AP with a password necessary for releasing a lock of the electronic device.

13. The electronic device of claim 8, wherein the information about the AP comprises a Radio Frequency (RF) signal of the AP, and
wherein the processor is further configured to control to determine a Received Signal Strength Indication (RSSI) on a basis of the RF signal, and set the security level according to a comparison result between the RSSI and a threshold value.

14. The electronic device of claim 8, wherein the information about the AP comprises a location of the electronic device or a current time, and
wherein the processor is further configured to control to set the security level according to whether the location or current time belongs to an area or time zone set to the AP.

15. An electronic device comprising:
one or more processors configured to execute computer programs;
a memory configured to store data and instructions; and
at least one program stored in the memory and configured to be executable by the one or more processors,
wherein the program is configured to:

pair the electronic device with an Access Point (AP);
obtain information about the AP from the AP via the pairing;
determine a security level of the electronic device based on the obtained information; and
perform one of locking the electronic device and unlocking the electronic device,
wherein the locking of the electronic device includes selecting one lock type, which corresponds to the determined security level, of one or more lock types, and applying the selected one lock type to the locking of the electronic device.

16. The electronic device of claim 15, wherein the information about the AP comprises one of setting a use restriction, not setting the use restriction, and a use restriction level.

* * * * *